US012736968B2

(12) United States Patent
Serstad et al.

(10) Patent No.: US 12,736,968 B2
(45) **Date of Patent: *Sep. 15, 2026**

(54) ROBOTIC VEHICLE NAVIGATON SYSTEM AND METHOD

(71) Applicant: Tompkins Robotics, Inc., Orlando, FL (US)

(72) Inventors: James M. Serstad, Orlando, FL (US); Michael C. Futch, Orlando, FL (US); Shenghong Zhang, Orlando, FL (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/982,730

(22) Filed: Dec. 16, 2024

(65) Prior Publication Data

US 2025/0117011 A1 Apr. 10, 2025

Related U.S. Application Data

(63) Continuation of application No. 18/598,246, filed on Mar. 7, 2024, now Pat. No. 12,197,228, which is a continuation of application No. 18/351,035, filed on Jul. 12, 2023, now Pat. No. 11,934,201, which is a (Continued)

(51) Int. Cl.

| | |
|---|---|
| ***G05D 1/02*** | (2020.01) |
| ***G05D 1/00*** | (2006.01) |
| ***G05D 1/617*** | (2024.01) |
| ***G05D 1/69*** | (2024.01) |
| ***G05D 1/693*** | (2024.01) |

(52) U.S. Cl.

CPC ......... *G05D 1/0289* (2013.01); *G05D 1/0214* (2013.01); *G05D 1/617* (2024.01); *G05D 1/693* (2024.01)

(58) Field of Classification Search

CPC .... G05D 1/0289; G05D 1/0214; G05D 1/617; G05D 1/693; G05D 2109/10; G05D 1/244; G05D 2105/28; G05D 2107/70; B65G 43/08

See application file for complete search history.

(56) References Cited

U.S. PATENT DOCUMENTS

| | | | |
|---|---|---|---|
| 3,635,322 | A | 1/1972 | Raudat et al. |
| 6,082,523 | A | 7/2000 | Weeks |
| 11,720,122 | B1 | 8/2023 | Serstad et al. |

(Continued)

FOREIGN PATENT DOCUMENTS

| | | | |
|---|---|---|---|
| SU | 1131487 A1 | * | 12/1984 |

*Primary Examiner* — Rodney A Butler

(57) ABSTRACT

System is configured to receive article information corresponding to articles to be transported by computer-controlled vehicles, the articles comprising a first article and a second article, each having a maximum article dimension. System is also configured to assign travel routes about a grid comprising grid cells for the vehicles to travel thereon. The travel route of a first vehicle carrying the first article includes a turning maneuver at a first grid cell. System is configured to control the turning maneuver of the first vehicle in the first grid cell such that there is no contact between the first article carried on the first vehicle with a second article carried on a second vehicle present in a second grid cell that is adjacent to the first grid cell when the first vehicle is undertaking the turning maneuver.

20 Claims, 9 Drawing Sheets

Related U.S. Application Data continuation of application No. 18/050,283, filed on Oct. 27, 2022, now Pat. No. 11,720,122.

(56) References Cited

U.S. PATENT DOCUMENTS

| | | | | |
|---|---|---|---|---|
| 2014/0368330 | A1* | 12/2014 | Watanabe ................ | G08G 1/16 340/475 |
| 2016/0297072 | A1 | 10/2016 | Williams et al. | |
| 2018/0141211 | A1 | 5/2018 | Wellman et al. | |
| 2018/0335782 | A1 | 11/2018 | Xu et al. | |
| 2018/0357601 | A1 | 12/2018 | Jacobus et al. | |
| 2019/0064785 | A1 | 2/2019 | Wurman et al. | |
| 2020/0101971 | A1* | 4/2020 | Fan ......................... | G01S 17/10 |
| 2021/0114062 | A1 | 4/2021 | Liu et al. | |
| 2021/0138649 | A1 | 5/2021 | Baer et al. | |
| 2022/0024691 | A1* | 1/2022 | Serstad ................... | B66F 9/063 |
| 2022/0100184 | A1 | 3/2022 | Natarajan et al. | |
| 2022/0194248 | A1 | 6/2022 | Kalouche | |
| 2023/0019883 | A1 | 1/2023 | Austrheim et al. | |
| 2024/0255966 | A1 | 8/2024 | Segall et al. | |

* cited by examiner

ROBOTIC VEHICLE NAVIGATON SYSTEM AND METHOD

CROSS-REFERENCE TO RELATED APPLICATIONS

This application is a continuation application of U.S. patent application Ser. No. 18/351,035 filed on Jul. 12, 2023, which is a continuation application of U.S. patent application Ser. No. 18/050,283 filed on Oct. 27, 2022, and issued as U.S. Pat. No. 11,720,122 on Aug. 8, 2023, the entire contents of which are incorporated by reference herein.

TECHNICAL FIELD

This invention relates generally to the field of computer-controlled vehicles, and particularly to systems and methods for communications with computer-controlled vehicles for signaling, collision avoidance, path coordination, or other autonomous control.

BACKGROUND

Transport of articles by computer-controlled vehicles within an industrial facility is increasingly common. The transport of such articles can be for purposes such as, for example, sorting articles, parcels, and packages by their shipping destinations, consolidating articles into orders, moving articles to a location for assembly, retrieving articles from storage locations, staging articles for shipping. Because of ever-shortening lead time expectations in supply chains and the need to control or reduce costs throughout the supply chain, the productivity of such computer-controlled vehicles is becoming critical.

Navigation systems of computer-controlled vehicles often use a grid setup consisting of grid cells jointed to form a single grid for controlling and managing navigation of several such computer-controlled vehicles on a surface or platform. In some grid setups, fiducial markers may be provided wherein the fiducial markers are arranged in a two-dimensional array on the surface on which the vehicles operate. The vehicles themselves include a plurality of advanced sensors that reference the fiducial markers to obtain the vehicle's location and orientation. In some setups, the fiducial markers may be arranged in squares such that the distance between the markers is the same in both the x and the y directions. In some alternate setups, the distance between markers in the x direction may be different from that in the y direction, thus creating rectangular shaped grid locations. Productivity of such a grid-based article sorting systems can theoretically be increased by minimizing the size of each grid location whereby more receiving locations, more delivering locations, and more travel paths for fixed area of floor space. A smaller footprint further lessens the cost of the real estate occupied by the system and reduces the distance the vehicles must travel to complete their tasks. On the other hand, there is a requirement for the size of each grid location to be large enough to accommodate the largest items to be carried by the vehicles.

Accordingly, opportunities exist for optimizing sorting systems whereby large items can be carried by vehicles on surfaces with reduced grid sizes.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more implementations, a system for use in directing an article sorting operation is provided. The system may include a server, computer-controlled vehicles, a grid comprising grid cells for the computer-controlled vehicles to travel thereon, and destination containers. The server may include a memory, a processor, and a routing engine. The system is configured to: receive, at the server, article information corresponding to a plurality of articles to be transported by the computer-controlled vehicles, the plurality of articles comprising a first article and a second article each having a maximum article dimension; assign, by the routing engine, travel routes about the grid for the computer-controlled vehicles to travel thereon for transporting the plurality of articles to the destination containers, wherein the travel route of a first computer-controlled vehicle carrying the first article includes a turning maneuver at a first grid cell; control, by the routing engine, the turning maneuver of a first computer-controlled vehicle in a first grid cell such that there is no contact between a first article carried on the first computer-controlled vehicle with a second article carried on a second computer-controlled vehicle present in a second grid cell that is adjacent to the first grid cell when the first computer-controlled vehicle is undertaking the turning maneuver.

According to one or more implementations, a system for use in directing an article sorting operation is provided. The system may include a server, computer-controlled vehicles, a grid comprising grid cells for the computer-controlled vehicles to travel thereon, and destination containers. The server may include a memory, a processor, and a routing engine. The system is configured to: comprising a memory, a processor, and a routing engine, the system configured to: receive, at the server, article information corresponding to a plurality of articles to be transported by the computer-controlled vehicles, the plurality of articles comprising a first article and a second article each having a maximum article dimension; assign, by the routing engine, travel routes about the grid for the computer-controlled vehicles to travel thereon for transporting the plurality of articles to destination containers, the travel routes comprising turning maneuvers; control, by the routing engine, turning maneuvers of a first computer-controlled vehicle in a first grid cell and of a second computer-controlled vehicle in a second grid cell that is adjacent to the first grid cell such that, when both the first and second computer-controlled vehicles are undertaking turning maneuvers simultaneously, there is no contact between the first article carried on the first computer-controlled vehicle and the second article carried on the second computer-controlled vehicle.

According to one or more implementations, a system for use in directing an article sorting operation is provided. The system may include a server, computer-controlled vehicles, a grid comprising grid cells for the computer-controlled vehicles to travel thereon, and destination containers. The server may include a memory, a processor, and a routing engine. The system is configured to: receiving, at the server, of article information corresponding to a plurality of articles to be transported by the computer-controlled vehicles, the plurality of articles comprising a first article and a second article each having a maximum article dimension; assigning, by the routing engine, of travel routes about the grid for the computer-controlled vehicles to travel thereon for transporting the plurality of articles to the destination containers such that there is no contact between a first article carried on a first computer-controlled vehicle undertaking a turning maneuver in a first grid cell with a second article carried on a second computer-controlled vehicle traveling, stopped, or undertaking a turning maneuver, in a second grid cell that is adjacent to the first grid cell when only one of the first and second computer-controlled vehicles is undertaking a turning maneuver.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
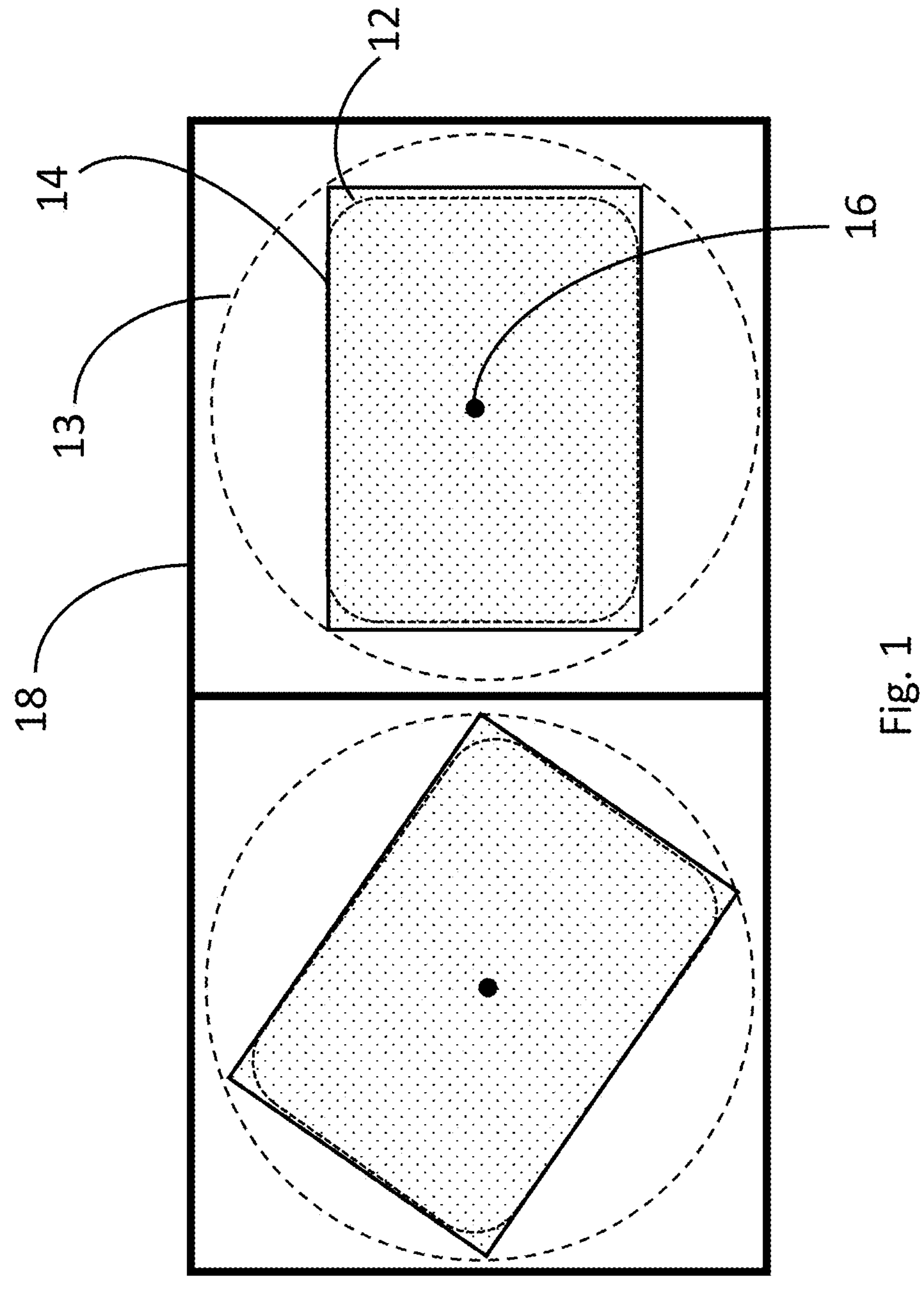
FIG. 1 illustrates turn radii of adjacent turns not overlapping when a first computer-controlled vehicle is undertaking a turning maneuver while a second computer-controlled vehicle present in an adjacent grid cell waits for the first computer-controlled vehicle to complete its turning maneuver, wherein the article dimensions carried by the first and second vehicles are within a predetermined range, according to one or more embodiments of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

As noted earlier, transport of articles within an industrial facility by computer-controlled vehicles is increasingly common. Many of these computer-controlled vehicles operate on a grid comprising a plurality of grid sections or grid cells. Each of these grid cells may include, for e.g., fiducial markers attached thereto with the fiducial markers helping with vehicle navigation and routing. The grid sections are typically arranged in a two-dimensional array on the surface on which the vehicles operate. The vehicles reference the fiducial markers to obtain their location and their direction. In some implementations, the fiducial markers are often arranged in squares, where the distance between the markers is the same in both the x and the y directions, though in some cases the distance between markers in the x direction may be different from that in the y direction, thus creating rectangular shaped grid locations. The grid cells may take other shapes as well. The overall size of the array is dictated by several factors including the number of vehicles, traffic flow patterns, number of locations where the vehicles receive items and number of locations to which the vehicles deliver items, and the size of the individual grid locations. The size of the grid locations is especially important. By minimizing the size of each grid location, it is possible to fit more receiving locations, more delivering locations, and more travel paths in the same amount of floor space in the facility. The smaller footprint lessens the cost of the real estate occupied by the system and reduces the distance the vehicles must travel to complete their tasks. However, the size of each grid location must be large enough to accommodate the largest items carried by the vehicle.

Embodiments of the present invention relates to an article sorting operation, and in particular to a system for managing routing of computer-controlled vehicles about a grid as the vehicles travel on the grid for transporting a plurality of articles to be sorted including one or more oversized articles from an induction station, location or point to one or more destination containers, wherein the vehicles deliver the articles to the destination containers, for example, by the manipulation of the vehicle, or an element thereof, from a first position to a second position. In one embodiment, the articles to be transported to destination containers may be inducted onto the vehicles manually or automatically, for example, from a put wall. Embodiments described herein accordingly relate to an improved navigation management system for vehicles used in an article sortation operation. According to advantageous aspects of the present invention, the footprint of floor space in a facility can be reduced by the reduction of the size of each grid, the size of the article being transported can be increased, the number of receiving locations and delivering locations can be increased, and more travel paths can be provided for a given footprint of floor space in a facility, the distance the vehicles must travel to complete their tasks can be reduced, and the cost of the real estate occupied by the system can be reduced.

Automated mobile robots (AMRs) and computer-controlled vehicles 12 (see FIG. 9, for example) that use grids comprising grid cells for navigation typically turn by stopping over a fiducial marker 16 and rotating approximately 90 degrees or 180 degrees to change the direction of travel. In at least one embodiment, the location of fiducial marker 16 may approximately coincide with, or superimposes on, the rotational center of turn radius 13 (see FIG. 1, for example). If two vehicles happen to be in adjacent grid locations when both vehicles are simultaneously undertaking turning maneuvers, articles 14 (e.g., article 14 in the form of an oversized article) being carried on by these vehicles may encroach onto the adjacent vehicle's turn radius 13 and cause mechanical contact or collision-between the articles, between the vehicles, or between an article and a vehicle. Therefore, a maximum size of article 14 carried on the vehicle may be limited by the turn radii 13 of two adjacent vehicles, unless adjacent vehicles are prohibited from turning at the same time. If turning is never limited in the system, i.e., simultaneous turning maneuvers in adjacent grid cells are always allowed (for e.g., as shown in FIG. 3), then the size of the articles may need to be within a predetermined range such that whole of the article remains fully within a grid location throughout the turning maneuver.

FIG. 1 illustrates a first setup wherein turn radii 13 of adjacent turns are not overlapping when a first computer-controlled vehicle 12 is undertaking a turning maneuver while a second computer-controlled vehicle 12 present in an adjacent grid cell waits for the first computer-controlled vehicle to complete its turning maneuver, wherein the dimensions of article 14 carried by the first and second vehicles are within a predetermined range.

Figure 2:
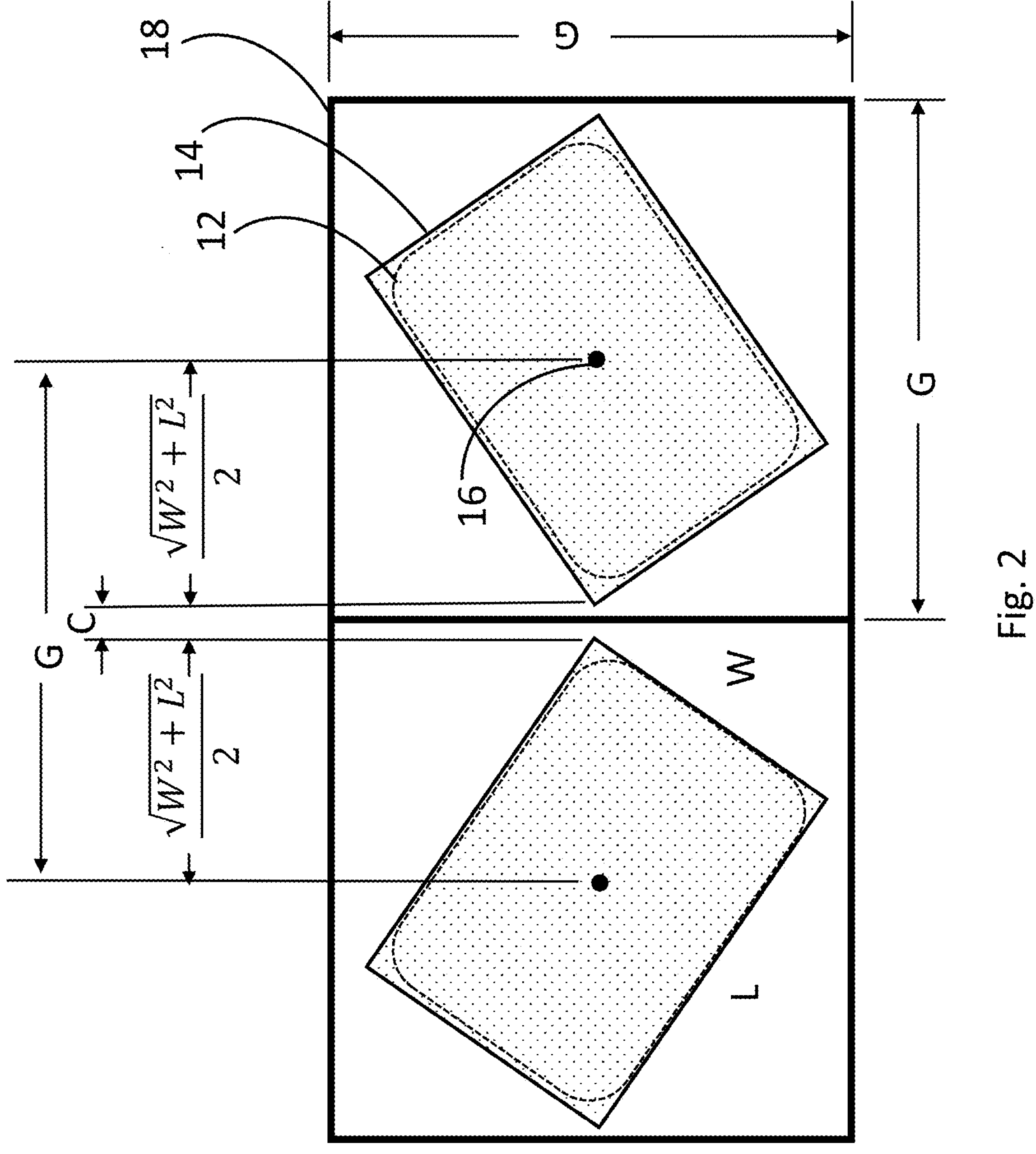
FIG. 2 illustrates measurements associated with the embodiment of FIG. 1 wherein both the first and second computer-controlled vehicles are simultaneously turning adjacent to each other with the turn radii of adjacent turns not overlapping, wherein the article dimensions carried by the first and second vehicles are within a predetermined range, according to one or more embodiments of the presently disclosed subject matter.

FIG. 2 illustrates the first setup of FIG. 1 wherein both the first and second computer-controlled vehicles are simultaneously turning adjacent to each other with the turn radii 13 of adjacent turns not overlapping, wherein the article dimensions carried by the first and second vehicles are within a predetermined range. FIG. 2 further shows measurements used in the derivation of an equation which dictates the maximum size of the articles that can be carried on vehicles in the case where simultaneous adjacent turns are always allowed. To prevent contact or collision when turning with adjacent turns, the dimensions of the article satisfy the equation: $\sqrt{W^2+L^2}+C \leq G$ or $G \geq \sqrt{(W^\wedge 2+L^\wedge 2)}+C$, where: G is the length of the square grid side, C is the required clearance of the articles, L is the maximum length of the article, and W is the maximum width of the article. Further, solving for W, we have: $W \leq (G-C)^2-L^2$.

Figure 3:
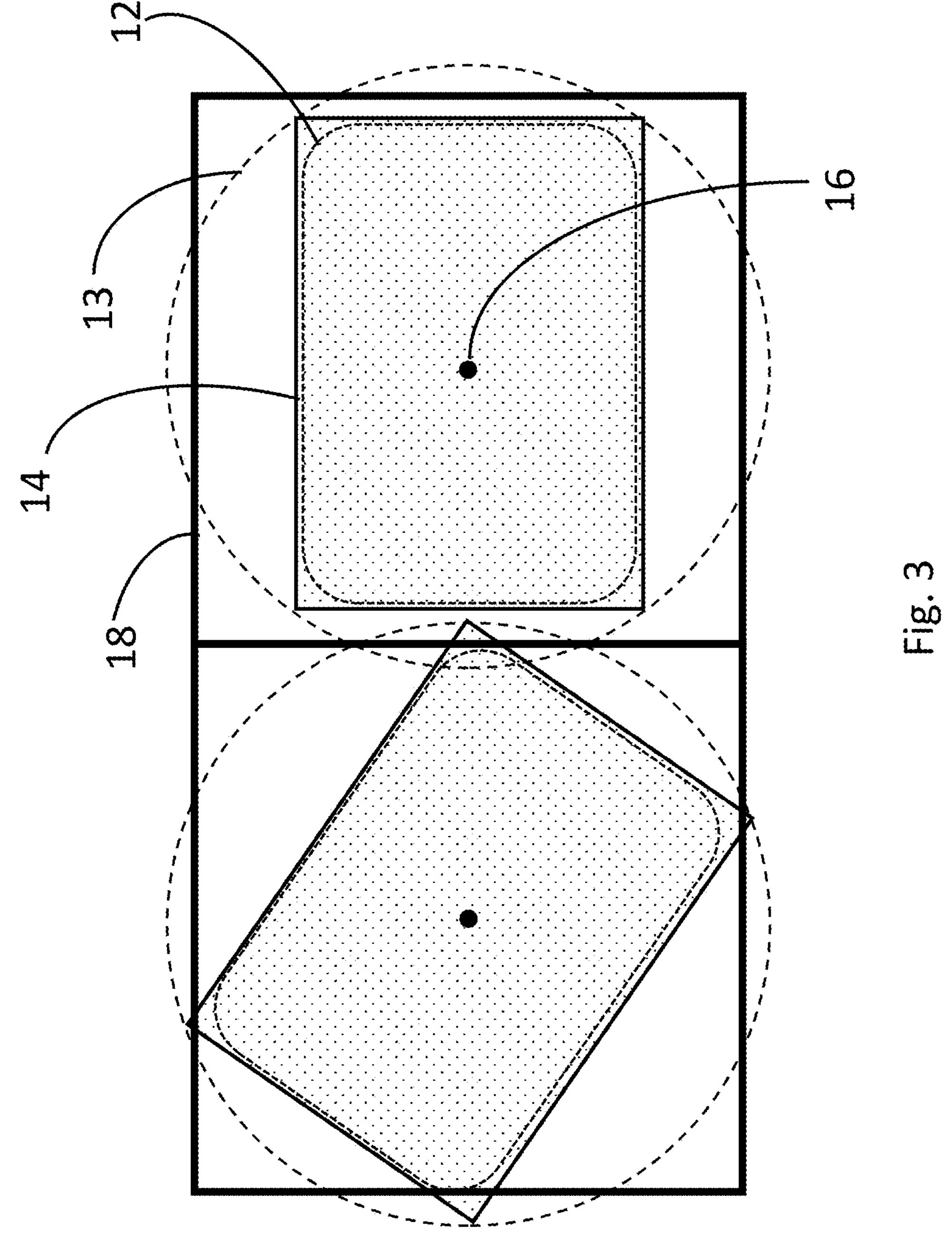
FIG. 3 illustrates turn radii of adjacent turns overlapping when a first computer-controlled vehicle is undertaking a turning maneuver while a second computer-controlled vehicle present in an adjacent grid cell waits for the first computer-controlled vehicle to complete its turning maneuver, wherein the article dimensions carried by the first and second vehicles exceed a predetermined range; in this set up, both vehicles undertaking turning maneuvers at the same time can result in mechanical interference, according to one or more embodiments of the presently disclosed subject matter.

FIG. 3 illustrates a second setup wherein turn radii 13 of adjacent turns are overlapping when a first computer-controlled vehicle 12 is undertaking a turning maneuver while a second computer-controlled vehicle 12 present in an adjacent grid cell waits for the first computer-controlled vehicle 12 to complete its turning maneuver, wherein the dimensions of articles 14 carried by the first and second vehicles exceed a predetermined range; in this set up, both vehicles undertaking turning maneuvers at the same time can result in mechanical interference. In the setup of FIG. 3, when the dimension(s) of both the oversized articles 14 shown in FIG. 3 exceed the predetermined range, both vehicles cannot undertake a turning maneuver simultaneously because such an undertaking can result in mechanical interference, contact or collision-between the articles, between the vehicles, or between an article and a vehicle.

Figure 4:
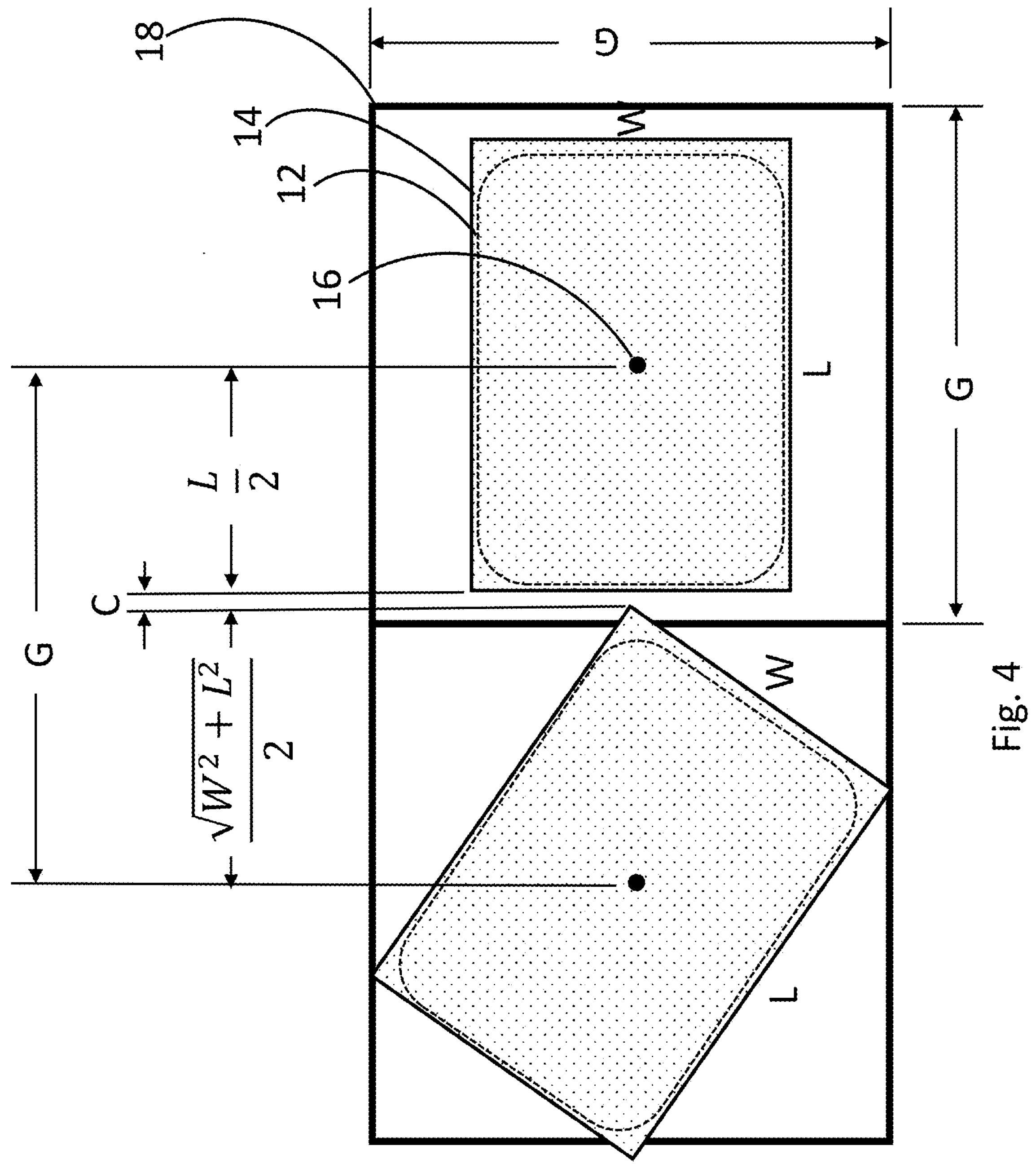
FIG. 4 illustrates measurements associated with the embodiment of FIG. 3 wherein the first computer-controlled vehicle is undertaking a turning maneuver while a second computer-controlled vehicle present in an adjacent grid cell waits for the first computer-controlled vehicle to complete its turning maneuver, wherein the article dimensions carried by the first and second vehicles exceed a predetermined range, according to one or more embodiments of the presently disclosed subject matter.

FIG. 4 depicts the second setup of FIG. 3 wherein the first computer-controlled vehicle is undertaking a turning maneuver while a second computer-controlled vehicle present in an adjacent grid cell waits for the first computer-controlled vehicle to complete its turning maneuver, wherein the article dimensions carried by the first and second vehicles exceed a predetermined range, according to one or more embodiments of the presently disclosed subject matter. As evident from FIG. 4, when simultaneous turning maneuvers in adjacent grid cells is prohibited, then the turn radii 13 may overlap to some degree; this in turn can allow for the grid cells to be of a smaller surface area-all else being equal. The maximum size of the article in this case is as shown in FIG. 4. Accordingly as supported by FIG. 4, when simultaneous turning maneuvers in adjacent grid cells is prohibited, the dimensions of the article satisfy the equation:

$$\frac{\sqrt{W^2+L^2}}{2}+\frac{L}{2}+C \leq G \text{ or } G \geq \sqrt{(W^\wedge 2+L^\wedge 2)/2}+L/2+C,$$

where: G is the length of the square grid side, C is the required clearance of the articles, L is the maximum length of the article, and W is the maximum width of the article. Further, solving for W, we have: $W \leq \sqrt{(2(G-C)-L)^2-L^2}$.

Figure 5:
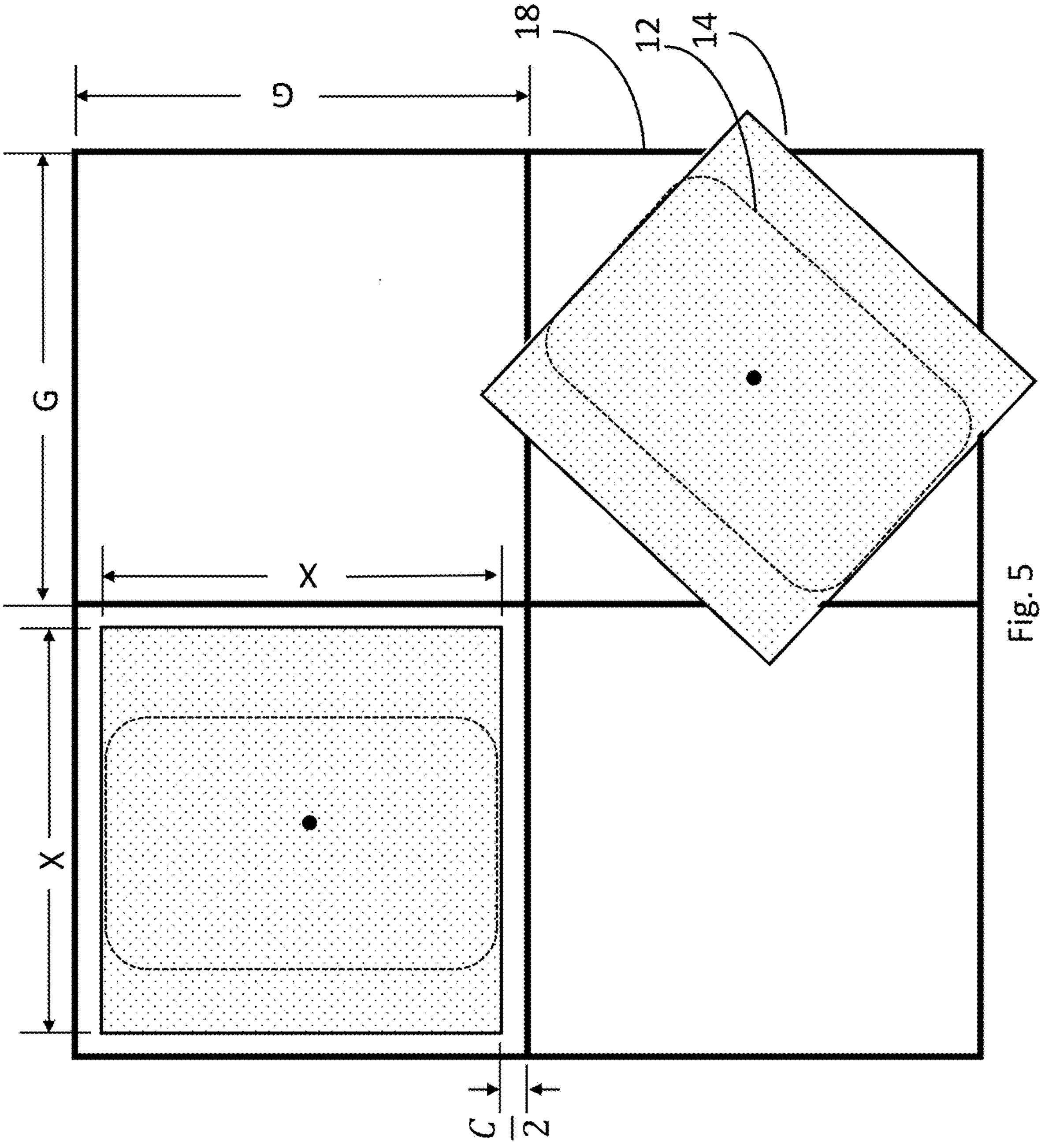
FIG. 5 depicts an example of one embodiment of a first computer-controlled vehicle undertaking a turning maneuver while a second computer-controlled vehicle is present in a non-adjacent grid cell, wherein the article dimensions carried by the first and second vehicles exceed a predetermined range, according to one or more embodiments of the presently disclosed subject matter.

FIG. 5 depicts a third setup where a first computer-controlled vehicle undertakes a turning maneuver while a second computer-controlled vehicle is present in a non-adjacent grid cell. The maximum size of the item as shown in FIG. 5 is possible if turning is prohibited when any vehicles are in adjacent grid locations. Referring to FIG. 5, when turning with no computer-controlled vehicles adjacent to turning computer-controlled vehicles, the dimensions of the article satisfy the equation: G≥X+C, where: G is the length of the grid size, C is the clearance of the articles, and X is the longest side of the article.

Figure 6:
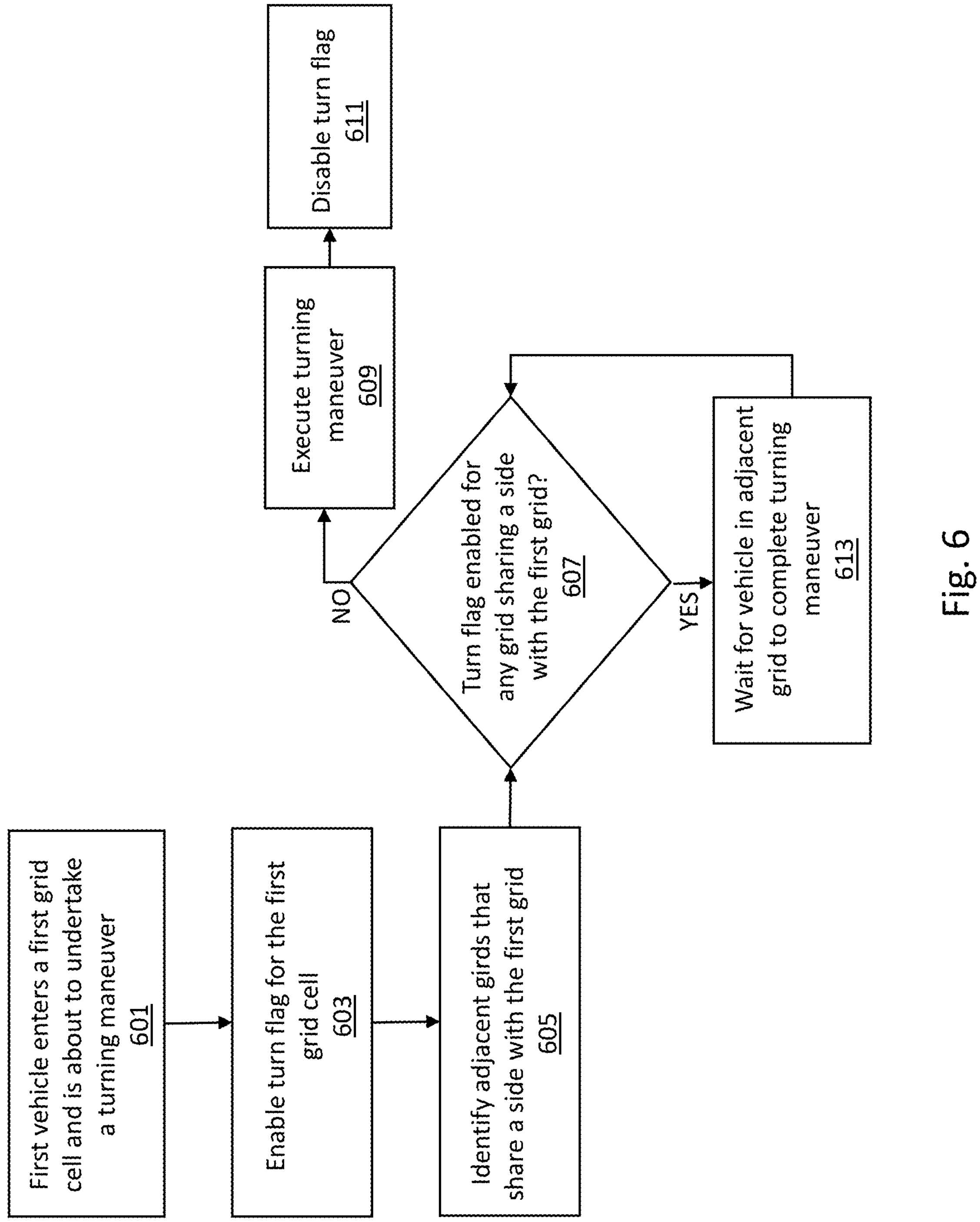
FIG. 6 depicts a flowchart of an exemplary process flow for delaying a turning maneuver by a computer-controlled vehicle in a grid cell whenever there is another computer-controlled vehicle undertaking a turning maneuver in an adjacent grid cell, according to one or more embodiments of the presently disclosed subject matter.

FIG. 6 depicts a flowchart of an exemplary process flow for scheduling a turning maneuver (and delaying a turning maneuver as needed) by a computer-controlled vehicle in a grid cell whenever there is another computer-controlled vehicle undertaking a turning maneuver or is about to undertake a turning maneuver in an adjacent grid cell. The exemplary process shown in FIG. 6 may be implemented, for example, by control server 802 and/or host management server 804, either alone or working in combination. Referring to FIG. 6, at step 601, a first computer-controlled vehicle 12 enters a first grid cell and is about to undertake a turning maneuver. The computer-controlled vehicle 12 may be selected from a plurality of computer-controlled vehicles. The computer-controlled vehicle 12 may be selected based on availability (i.e., the computer-controlled vehicle 12 is not currently carrying out any other tasks) and/or proximity to the intake location. In an embodiment where the first grid cell 18 comprises a polygon shape such as a square shape or a rectangle shape, the first grid cell may include four adjacent cells. By comparison, in an embodiment where the grid cell 18 comprises another polygon shape such as a hexagon shape, the first cell may include 6 adjacent cells.

At step 603, control server 802 and/or host management server 804 enables a turn flag for the first grid cell where the first computer-controlled vehicle 12 is about to undertake a turning maneuver; alternatively, routing engine 812 may perform this task. At step 605, control server 802 and/or host management server 804 identifies adjacent grids that share a side with the first grid where the first computer-controlled vehicle 12 is about to undertake a turning maneuver. At step 607, control server 802 and/or host management server 804 submits a query, for e.g., to routing engine 812 to identify whether a turn flag is enabled for any grid that shares a side with the first grid; if the query returns "NO", then the process moves to step 609 wherein the system signals to the first computer-controlled vehicle 12 in the first grid to undertake and complete turning maneuver; alternatively, routing engine 812 may perform this task. At step 611, after the first computer-controlled vehicle 12 has completed its turning maneuver, control server 802 and/or host management server 804 disables the turn flag for the first grid cell where the first computer-controlled vehicle 12 just completed a turning maneuver; alternatively, routing engine 812 may perform this task.

If at step 607, if the query to identify whether a turn flag is enabled for any grid sharing a side with the first grid returns feedback of "YES", then the process moves to step 613 wherein the system signals to the first computer-controlled vehicle 12 to wait for a predetermined period of time to allow for the other computer-controlled vehicle in the grid adjacent to first grid to complete turning maneuver. In one embodiment, the predetermined interval of time can be equal to the average time taken for a 90-, 180-, 270- or 360-degree turn. Following this waiting period, the query is re-submitted by control server 802 and/or host management server 804 for as many times as needed until the query returns "NO" as the feedback, after which the process moves to step 609 wherein the system signals to the first computer-controlled vehicle 12 in the first grid to undertake and complete turning maneuver. At step 611, after the first computer-controlled vehicle 12 has completed its turning maneuver, control server 802 and/or host management server 804 disables the turn flag for the first grid cell where the first computer-controlled vehicle 12 just completed a turning maneuver; alternatively, routing engine 812 may perform this task.

Figure 7:
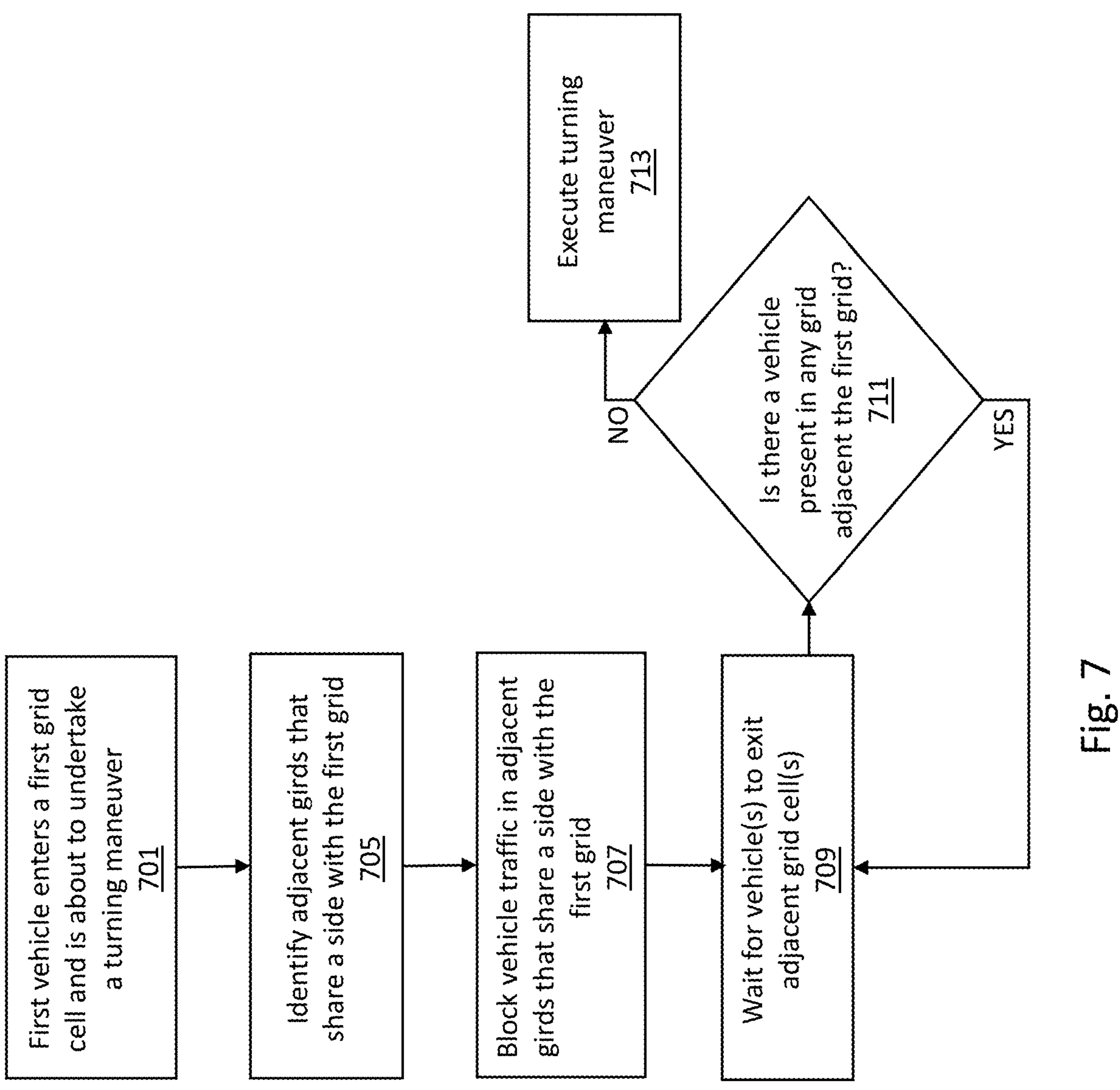
FIG. 7 depicts a flowchart of an exemplary process flow for blocking traffic in adjacent grids that share a side with the first grid during a period in which a computer-controlled vehicle is undertaking, or is about to undertake, a turning maneuver, according to one or more embodiments of the presently disclosed subject matter.

FIG. 7 depicts a flowchart of an exemplary process flow for blocking traffic in an adjacent grid that shares a side with the first grid during a period in which a computer-controlled vehicle is undertaking, or is about to undertake, a turning maneuver in the first grid. The exemplary process shown in FIG. 7 may be implemented, for example, by control server 802 and/or host management server 804, either alone or working in combination. Referring to FIG. 7, at step 701, a first computer-controlled vehicle 12 enters a first grid cell and is about to undertake a turning maneuver. The computer-controlled vehicle 12 may be selected from a plurality of computer-controlled vehicles. The computer-controlled vehicle 12 may be selected based on availability (i.e., the computer-controlled vehicle 12 is not currently carrying out any other tasks) and/or proximity to the intake location. At step 705, control server 802 and/or host management server 804 identifies adjacent grids that share a side with the first grid; alternatively, routing engine 812 may perform this task.

At step 707, control server 802 and/or host management server 804 signals to routing engine 812 to initiate blocking vehicle traffic in adjacent grids that share a side with the first grid in which the computer-controlled vehicle is undertaking, or is about to undertake, a turning maneuver. At step 709, prior to the computer-controlled vehicle undertaking the turning maneuver in the first grid, control server 802 and/or host management server 804 operates to wait for a predetermined period of time to allow for any computer-controlled vehicle(s) currently operating in an adjacent grid cell(s) to exit the adjacent grid cell(s); alternatively, routing engine 812 may perform this task. In one embodiment, the predetermined interval of time can be equal to the average time taken by computer-controlled vehicle to travel through one grid cell plus the average time taken for a 90-, 180-, 270- or 360-degree turn.

At step 711, control server 802 and/or host management server 804 submits a query to routing engine 812 to identify whether there is any computer-controlled vehicle(s) present in any grid adjacent the first grid; if the query returns a "NO" feedback, then the process moves to step 713 wherein the system signals to the first computer-controlled vehicle 12 in the first grid to undertake and complete turning maneuver; in some embodiments, routing engine 812 may perform this task.

If at step 711, if the query submitted by control server 802 and/or host management server 804 to routing engine 812 to identify whether a turn flag is enabled for any grid sharing a side with the first grid returns "YES", then the process returns to step 709 wherein control server 802 and/or host management server 804 operates to wait for the predetermined period of time to allow for any computer-controlled vehicle(s) currently operating in an adjacent grid cell(s) to exit the adjacent grid cell(s); in some embodiments, routing engine 812 may perform this task. In one embodiment, the predetermined interval of time can be equal to the average time taken by computer-controlled vehicle to travel through one grid cell plus the average time taken for a 90-, 180-, 270- or 360-degree turn. Following this waiting period, the query is re-submitted by control server 802 and/or host management server 804 for as many times as needed until the query returns "NO" as the feedback, after which the process moves to step 713 wherein the system signals to the first computer-controlled vehicle 12 in the first grid to undertake and complete turning maneuver.

Figure 8:
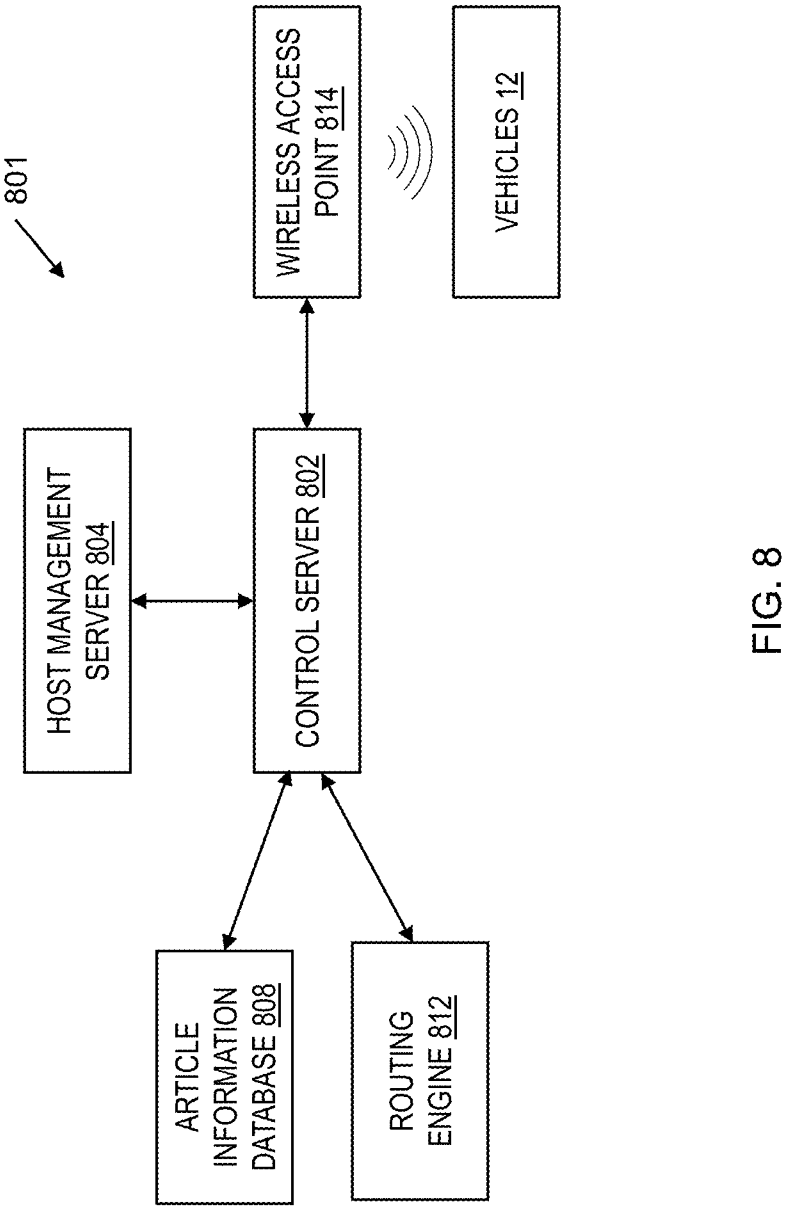
FIG. 8 illustrates a block diagram of an exemplary embodiment of a sorting system as described herein, according to one or more embodiments of the presently disclosed subject matter.

FIG. 8 depicts an exemplary block diagram of an exemplary embodiment of a system for article sorting, vehicle navigation and routing management system ("system"), as described herein. According to various embodiments, system 801 for directing an article sorting operation comprises a control server such as control server 802 for use in directing an article sorting operation. In various embodiments, system 801 includes control server 802, article information database 808, routing engine 812, host management server 804, wireless access point 814, and computer-controlled vehicles 12, each of which are depicted in a representative manner as blocks representing a generic descriptor of the technology. System 801 further comprises destination containers, and a grid comprising a plurality of grid cells 18 for the computer-controlled vehicles 12 to travel thereon. Control server 802 comprises, among other components, a memory, and a processor. Control server 802 may further comprise, or have access to, a routing engine 812 and an article information database 808. Control server 802 is configured for communicating with one or more components of the system 801 as described herein, and as shown, for example, in FIGS. 1-9. In one embodiment, control server 802 includes memory, a processor, and/or one or more communication interfaces communicatively coupled to each other. A network may form part of system 801, wherein the network may take on any appropriate form, including a wireless network such as Wi-Fi, cellular, or other frequency bands for private use, or a hard-wired network such as LAN, WAN, internet, etc., and combinations thereof. In one embodiment, control server 802 and/or host management server 804 (both control server 802 and host management server 804 may alternately be referred to herein as "server") may communicate over the network with the cloud. In some embodiments, one or more components of control server 802 and host management server 804 may reside in the cloud. Similarly, several of the components such as, for example, computer-controlled vehicle 12, routing engine 812, article information database 808, control server 802, and host management server 804 may communicate over the network with the cloud. In some embodiments, one or more components of system 801 may reside in the cloud. For example, in one embodiment, control server 802 and/or host management server 804 may reside in the cloud. In at least one embodiment, host management server 804 may be in communication with one or more third-party servers, such as warehouse management system servers and/or databases.

Figure 9:
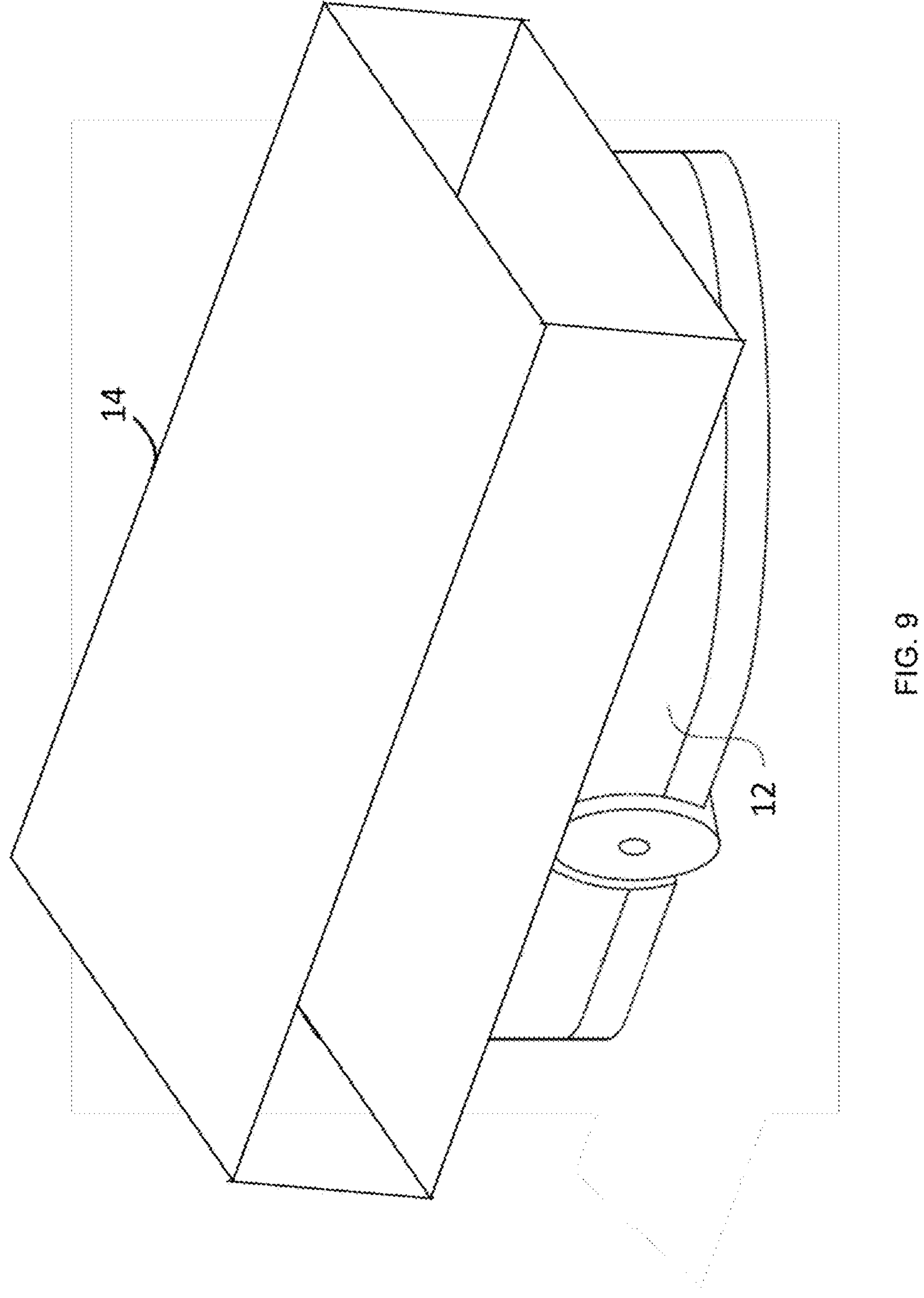
FIG. 9 depicts a perspective view of a computer-controlled vehicle carrying an article having a measurement component that is above a threshold value, according to one or more embodiments of the presently disclosed subject matter.

FIG. 9 depicts a perspective view of a computer-controlled vehicle carrying an article 14 that is an oversized article having a measurement component that is above a threshold value, according to one or more embodiments of the presently disclosed subject matter. FIG. 9 accordingly depicts an example of a computer-controlled vehicle 12 used for transporting oversized articles as well as regular sized articles.

According to various embodiments, system 801 is configured for receiving, at the control server 802, of article information, for example, from article information database 808, corresponding to a plurality of articles 14 to be transported by the computer-controlled vehicles, the plurality of articles comprising a first article 14 that is oversized (i.e., an oversized article) and having a maximum article dimension, and a second article (also an oversized article 14) having a maximum article dimension. The system 801 is further configured for calculating, by routing engine 812 or control server 802 or host management server 804, of a minimum area for each of the grid cells 18 that the grid is comprised of based on the maximum article dimension. In one embodiment, the minimum area for each of the grid cells 18 is provided to the routing engine 812 or control server 802 or host management server 804. In one embodiment, the minimum area for each of the grid cells 18 is calculated by a user and provided to the system as an input; the system is configured to work with a pre-established minimum area for each of the grid cells 18 that is provided to the System. The system 801 is further configured to assign, by the routing engine 812 or control server 802 or host management server 804, of travel routes about the grid for the computer-controlled vehicles to travel thereon for transporting the plurality of articles to destination containers, the travel routes comprising turning maneuvers The system 801 (via routing engine 812 or control server 802 or host management server 804) is further configured to calculate the minimum area for each grid cell 18 such that there is no contact between a first article 14 carried on a first computer-controlled vehicle 12 undertaking a turning maneuver in a first grid cell 18, and a second article 14 carried on a second computer-controlled vehicle 12 undertaking a turning maneuver in a second grid cell 18 that is adjacent to the first grid cell 18 when both the first and second computer-controlled vehicles are undertaking turning maneuvers simultaneously.

According to various embodiments, the system 801 (via routing engine 812 or control server 802 or host management server 804) is configured to control a travel path of the first computer-controlled vehicle such that the first computer-controlled vehicle travels within 10 mm of its intended travel path. However, in various embodiments, the system 801 may be configured to control a travel path of the first computer-controlled vehicle such that the first computer-controlled vehicle travels within 1, 2, 5, 10, 15, 20, 50, 100, 200, or 500 mm of its intended travel path. In other words, the system is configured to control a travel path of the first computer-controlled vehicle such that the first computer-controlled vehicle does not deviate more than 1, 2, 5, 10, 15, 20, 50, 100, 200, or 500 mm of its intended travel path. According to at least one embodiment, the system (via routing engine 812 or control server 802 or host management server 804) assigns a value of C, wherein C is a minimum required clearance between the first and second articles when both the first and second computer-controlled vehicles are undertaking the turning maneuvers simultaneously, such that $C \geq 20$ mm. However, in various embodiments, C can accordingly have any appropriate value that is greater than zero (i.e., $C > 0$ mm), for e.g., $C \geq 10$ mm, $C \geq 5$ mm, $C \geq 1$ mm, $C \geq 0.5$ mm, etc. Further, in various embodiments, the system 801 (via routing engine 812 or control server 802 or host management server 804) may be configured to assign a value of C such that it is at least 2X wherein, X is the maximum value that the first computer-controlled vehicle deviates or is expected to deviate from its intended travel path. In various embodiments, depending on the application, the value of C can be set below or above the 2X value, as dictated by the application at hand.

Accordingly, in various embodiments, the calculations may provide for a clearance buffer. In various embodiments, at least some non-zero clearance is provided for due to the reason that even the most accurate vehicle navigation systems nonetheless are subject to some degree of navigational inaccuracy. For example, in an embodiment where computer-controlled vehicles 12 are known to reliably remain within 10 mm of their intended travel paths, the system provides for a 20 mm clearance (the minimum required clearance C) between articles or vehicles in adjacent locations. Additional clearance may be required to account for tray wall thickness if the items are carried on a tray; alternatively, even if there are no tray walls, additional clearance may be required to account for articles which may not be perfectly centered on the rotational pivot point.

In some embodiments, system 801 may include a processor which routes the computer-controlled vehicles 12 from one point to another and ensures that the vehicles do not collide. By further controlling the vehicles such that two computer-controlled vehicles 12 in adjacent grid locations cannot turn at the same time, the maximum item size can be increased for a given grid size. Alternatively, for a given item size, the grid size can be minimized. In various, the grid cells 18 comprise various polygon shapes including square, rectangle, pentagon, hexagon, octagon, and similar other shapes. In an embodiment where the grid cell 18 comprises a square shape or a rectangle shape, the grid cell 18 includes four adjacent grid cells.

In various embodiments, the turning maneuver by the first computer-controlled vehicle comprises a turn angle of anywhere between 0-360 degrees. For example, in one embodiment, the turning maneuver by the first computer-controlled vehicle comprises a turn angle of at least 90-degrees. In another embodiment, the turning maneuver by the first computer-controlled vehicle comprises a turn angle of at least 180-degrees. In a further embodiment, the turning maneuver by the first computer-controlled vehicle comprises a turn angle of at least 270-degrees.

In various embodiments, the maximum article dimension comprises at least one of a: maximum length, maximum width, maximum diagonal length, maximum surface area, and maximum volume. For example, in one implementation wherein the maximum article dimension comprises a maximum length L and a maximum width W, wherein C is a minimum required clearance between the first and second articles when both the first and second computer-controlled vehicles are undertaking the turning maneuvers simultaneously, wherein a length G of each grid cell 18 is calculated such that G≥√(W^2+L^2)+C (i.e., $G \geq \sqrt{W^2+L^2}+C$.) In some embodiments, a maximum surface area (instead of the maximum length and maximum width) may be used to designate whether an article 14 is an oversized article or maximum sized article; in some alternate embodiments, a maximum volume occupied by the article 14 may be used to designate whether an article 14 is an oversized article or maximum sized article. The formulae provided herein may accordingly be adjusted based on what the maximum article dimension comprises of. Further, in some embodiments, the turning maneuver by the first computer-controlled vehicle 12 comprises a turn radius that approximately equals a length of a diagonal D formed from the maximum length L and the maximum width W wherein the maximum length L may make a right angle with the maximum width W.

According to at least one embodiment, system 801 for directing an article sorting operation comprises: control server 802, computer-controlled vehicles 12, a grid comprising grid cells 18 for the computer-controlled vehicles 12 to travel thereon, and destination containers. Control server 802 may comprise a memory, a processor, and a routing engine such as routing engine 812. System 801 is configured for: receiving, at control server 802, of article information, for example, from article information database 808, corresponding to a plurality of articles to be transported by the computer-controlled vehicles, the plurality of articles comprising a first article and a second article each having a maximum article dimension. System 801 is further configured for calculating, by the routing engine 812, of a minimum area for each of the grid cells 18 that the grid is comprised of based on the maximum article dimension. System 801 is further configured for assigning, by the routing engine 812, of travel routes about the grid for the computer-controlled vehicles to travel thereon for transporting the plurality of articles to the destination containers, wherein the travel route of a first computer-controlled vehicle carrying the first article includes a turning maneuver at a first grid cell 18. System 801 (or control server 802 forming a part thereof) is further configured for calculating the minimum area for each grid cell 18 such that there is no contact between a first article carried on a first computer-controlled vehicle undertaking a turning maneuver in a first grid cell 18 with a second article carried on a second computer-controlled vehicle present in a second grid cell 18 that is adjacent to the first grid cell 18 when only one of the first and second computer-controlled vehicles is undertaking a turning maneuver.

According to various embodiments, the maximum article dimension comprises a maximum length L and a maximum width W, wherein C is a minimum required clearance between the first and second articles when both the first and second computer-controlled vehicles are undertaking the turning maneuvers simultaneously, wherein a length G of each grid cell is calculated such that $$G \geq \sqrt{(W^\wedge 2 + L^\wedge 2)/2} + L/2 + C\left(\text{i.e., } G \geq \frac{\sqrt{W^2+L^2}}{2} + \frac{L}{2} + C.\right)$$

In various embodiments, system 801 (or control server 802 forming a part thereof) is further configured to allocate, by the routing engine 812, a time slot for the turning maneuver of a third computer-controlled vehicle whose travel route includes a turning maneuver in a grid cell 18 that is adjacent to the first grid cell 18 such that the third computer-controlled vehicle does not undertake the turning maneuver during a period when the first computer-controlled vehicle is undertaking the turning maneuver in the first grid cell 18. In some embodiments, system 801 (or control server 802 forming a part thereof) is further configured for receiving, at control server 802, of article information, for example, from article information database 808, corresponding to a plurality of articles to be transported by the computer-controlled vehicles, the plurality of articles comprising a first article and a second article each having a maximum article dimension. System 801 is further configured for calculating, by the routing engine 812, of a minimum area for each of the grid cells 18 that the grid is comprised of based on the maximum article dimension. System 801 is further configured for assigning, by the routing engine 812, of travel routes about the grid for the computer-controlled vehicles to travel thereon for transporting the plurality of articles to the destination containers, wherein the travel route of a first computer-controlled vehicle carrying the first article includes a turning maneuver at a first grid cell 18. System 801 is further configured for calculating the minimum area for each grid cell 18 such that there is no contact between a first article carried on a first computer-controlled vehicle undertaking a turning maneuver in a first grid cell 18 with a second article carried on a second computer-controlled vehicle traveling, stopped, or undertaking a turning maneuver, in a second grid cell 18 that is adjacent to the first grid cell 18 when only one of the first and second computer-controlled vehicles is undertaking a turning maneuver.

In some embodiments, the maximum article dimension comprises a maximum length X, wherein C is a minimum required clearance between the first and second articles when both the first and second computer-controlled vehicles are undertaking the turning maneuvers simultaneously, wherein a length G of each grid cell 18 is calculated such that $G \geq X+C$.

In various embodiments, system 801 (or control server 802) is further configured for receiving, at control server 802, of article information, for example, from article information database 808, corresponding to a plurality of articles to be transported by the computer-controlled vehicles, the plurality of articles comprising a first article having a measurement component that is above a threshold value. System 801 is further configured for assigning, by routing engine 812, of travel routes about the grid for the computer-controlled vehicles to travel thereon for transporting the plurality of articles to the destination containers, wherein the travel routes of the computer-controlled vehicles are assigned such that no computer-controlled vehicle undertakes a turning maneuver at a first grid cell 18 whenever there is at least one computer-controlled vehicle present in any adjacent grid cell 18.

In various embodiments, system 801 is configured for receiving, at control server 802, of article information, for example, from article information database 808, corresponding to a plurality of articles to be transported by the computer-controlled vehicles, the plurality of articles comprising a first article having a measurement component that is above a threshold value. System 801 is further configured for assigning, by the routing engine 812, of travel routes about the grid for the computer-controlled vehicles to travel thereon for transporting the plurality of articles to destination containers, wherein the travel route of a first computer-controlled vehicle carrying the first article includes a turning maneuver at a first grid cell 18. System 801 is further configured for allocating, by the routing engine 812, of a time slot for the turning maneuver of the first computer-controlled vehicle such that the first computer-controlled vehicle undertakes, and completes, the turning maneuver during a period when there are no other computer-controlled vehicles traveling, stopped, or undertaking a turning maneuver, in any grid cell 18 that is adjacent to the first grid cell 18.

In various embodiments, system 801 is configured for receiving, at control server 802, of article information, for example, from article information database 808, corresponding to a plurality of articles to be transported by the computer-controlled vehicles, the plurality of articles comprising a first article having a measurement component that is above a threshold value. System 801 is further configured for assigning, by routing engine 812, of travel routes about the grid for the computer-controlled vehicles to travel thereon for transporting the plurality of articles to the destination containers, wherein the travel route of a first computer-controlled vehicle carrying the first article includes a turning maneuver at a first grid cell 18. System 801 is further configured for allocating, by the routing engine 812, of a time slot for the turning maneuver of one or more computer-controlled vehicles whose travel routes include a turning maneuver in a grid cell 18 that is adjacent to the first grid cell 18 such that the one or more computer-controlled vehicles do not undertake the turning maneuver during a period when the first computer-controlled vehicle transporting the first article is undertaking the turning maneuver in the first grid cell 18.

In various embodiments, system 801 is configured for receiving, at control server 802, of article information, for example, from article information database 808, corresponding to a plurality of articles to be transported by the computer-controlled vehicles, the plurality of articles comprising a first article having a measurement component that is above a threshold value. System 801 is further configured for assigning, by the routing engine 812, of travel routes about the grid for the computer-controlled vehicles to travel thereon for transporting the plurality of articles to the destination containers, wherein the travel routes of the computer-controlled vehicles are assigned such that no computer-controlled vehicle undertakes a turning maneuver at a first grid cell 18 whenever there is at least one computer-controlled vehicle present in any adjacent grid cell 18.

In various embodiments, system 801 is configured for receiving, at control server 802, of article information, for example, from article information database 808, corresponding to a plurality of articles to be transported by the computer-controlled vehicles, the plurality of articles comprising a first article having a maximum measurement component comprising at least one of: a maximum article dimension, a maximum area, and a maximum volume. System 801 is further configured for calculating, by the routing engine 812, of a minimum area for each of the grid cells 18 that the grid is comprised of based on the maximum measurement element. System 801 is further configured for assigning, by the routing engine 812, of travel routes about the grid for the computer-controlled vehicles to travel thereon for transporting the plurality of articles to destination containers, the travel routes comprising turning maneuvers. System 801 is further configured for calculating the minimum area for each grid cell 18 such that there is no contact between a first article having the maximum measurement element carried on a first computer-controlled vehicle undertaking a turning maneuver in a first grid cell 18 and a second article having maximum article dimension carried on a second computer-controlled vehicle undertaking a turning maneuver in a second grid cell 18 that is adjacent to the first grid cell 18 when both the first and second computer-controlled vehicles are undertaking the turning maneuvers simultaneously.

In various embodiments, system 801 is configured for sizing each grid cell 18 such that the computer-controlled vehicle and article 14 in the form of an oversized article can fit inside the contours of grid cell 18 at least when a side of the article is parallel to a side of grid cell 18.

In at least one embodiment, the maximum article dimension is provided to system 801. In one embodiment, system 801 dynamically calculates the maximum article dimension based on a grid cell size provided to system 801. In one embodiment, system 801 dynamically calculates the grid cell size based on the maximum article dimension is provided to system 801. Accordingly, in at least some embodiments, no measurements are calculated or handled by system 801 wherein the system operates under the premise that any article sorted by the system could include the maximum article dimension, and every computer-controlled vehicle is expected to abide by the "no adjacent turns" (e.g., two computer-controlled vehicles can be in adjacent grid location, but they cannot turn at the same time) rule or the "no computer-controlled vehicle in adjacent grid while a first computer-controlled vehicle is turning in an adjacent grid cell" rule-irrespective of whether the computer-controlled vehicle is carrying an oversized article 14 or not.

In at least one embodiment, after one or more information acquisition devices acquire information of respective articles to be sorted, system 801 may operate to complete an analytical processing of the obtained information of all the articles to be sorted, thereby obtaining destination information of the respective articles to be sorted. For example, the system 801 may further include a control device in connection with all the information acquisition devices so as to obtain the information acquired by all the information acquisition devices, to obtain the destinations of the respective articles to be sorted.

In various embodiments, each of the computer-controlled vehicles may include a central processing unit ("CPU") or a processor configured to control the computer-controlled vehicle's movement and actions. The system may also include at least one centralized control system or controller (each having its own CPU or processor) for communicating with the computer-controlled vehicles and/or for controlling or directing the movement of each of the computer-controlled vehicles and/or the sorting system as a whole. The centralized controller may also be in communication with control server 802 that receives the article dimension information. Each computer-controlled vehicle may also be provided with a wireless communication system that is configured to communicate with the wireless communication systems of other computer-controlled vehicles as well as a wireless communication system of the centralized controller. These wireless communication systems may communicate with one another through any available wireless communication technology, for example, Wi-Fi communication (802.11 networks), radiofrequency (RF) communication (for example, in the 425 to 900 MHz frequency range), infrared (IR) communication, Bluetooth® communication, or cellular communication (3G, 4G, 5G, etc.).

Each of the computer-controlled vehicles preferably includes a propulsion or locomotion mechanism, for example, wheels or tracks and at least one motor for driving the wheels or tracks to move and steer the computer-controlled vehicle. In one embodiment, the movement of the computer-controlled vehicles occurs over a controlled grid comprising grid cells 18, where each computer-controlled vehicle may only move in two perpendicular directions. For instance, the computer-controlled vehicles may be configured only to move between grid cells 18 comprising nodes in a grid, the grid encompassing the area between the divestment locations and the pickup locations. However, other modes of movement of the computer-controlled vehicles, for e.g., optical navigation, radiofrequency-based navigation, visible light navigation, invisible light navigation, electromagnetic signal-based navigation, and similar other navigation technics are also within the scope of the presently disclosed subject matter. In one embodiment, the grid may be a square grid and may have its nodes spaced, for example, as a 1×1-foot grid, a 2×2-foot grid, a 3×3-foot grid, a 4×4-foot grid, a 5×5-foot grid, or a 6×6-foot grid. However, grids of other shapes are also within the scope of the presently disclosed subject matter. By constraining the computer-controlled vehicles in this manner, collisions may be avoided by each computer-controlled vehicle communicating with the central controller (or the controllers of the other computer-controlled vehicles) to ensure that it is moving to a grid node that will be unoccupied when it arrives.

In at least one embodiment, constraint of the computer-controlled vehicles' movements along a plane in two perpendicular directions may be achieved via any of (i) the centralized controller, (ii) each computer-controlled vehicle's individual controller, or (iii) through mechanical constraints, such as by placing the computer-controlled vehicles on a grid-rail system or by configuring each computer-controlled vehicle's wheels such that the computer-controlled vehicle's movement is so constrained. In other embodiments, the computer-controlled vehicles may be configured to move in any direction along the ground or along a plane, and collisions may be prevented through any of the various traffic-control methods known in the art including, for e.g., optical navigation, radiofrequency-based navigation, visible light navigation, invisible light navigation, electromagnetic signal-based navigation.

In at least one embodiment, computer-controlled vehicle 12 (for e.g., in the form of an AMR) transports an oversized article 14, which includes an identifying tag that can be read by an information acquisition device such as a scanner, with the identifying tag including or in the form of an RFID tag, a barcode, or a QR code. A carrying surface provided on top of computer-controlled vehicle 12 may be appropriately sized at its inner dimensions to hold the maximum allowable size of an (oversized) article 14. The destination container (not shown) may be appropriately sized at its outer dimensions to fit therein the oversized article 14 to be deposited therein by the computer-controlled vehicles 12. The carrying surface may further include features that assist the computer-controlled vehicles 12 in engaging the article, such as an outer lip, a cross-belt, one or more magnets, hooking areas, or the like. Accordingly, in at least one embodiment, an article 14 received at a computer-controlled vehicle is an oversized item that needs to be sorted; to this end, the system may include one or more large article divest locations that are larger than other regular divest locations, for receiving oversized items. To identify whether an article includes a maximum article dimension (for e.g., to identify whether an article is an oversized article), an information acquisition device (such as, for e.g., a scanner) at each induction location reads the article information from the identifying tag and communicates, via its communicator, that article information to a system server such as control server 802. The article information may alternatively or in addition be received from article information database 808 (or verified against article information found at article information database 808). The article 14 may be divested into a destination container (e.g., a tote or other container). A centralized controller forming part of or is in communication with control server 802, receives this article information from control server 802, then associates the article information with a particular computer-controlled vehicle 12 onto which the article 14 is placed, as determined by an information acquisition device such as a scanner located at the induction location. In some embodiments, the computer-controlled vehicle 12 may include a cross-belt for engaging and collecting the oversized article. An identifying tag on the oversized article may be scanned at the induction location to associate the computer-controlled vehicle with a particular oversized article. The centralized controller also determines a specific destination container among a plurality of destination containers to discharge the article thereto; the centralized controller then directs the computer-controlled vehicle 12 to transport the oversized article to the assigned destination container. The centralized controller, for e.g., operating on control server 802 or in communication with control server 802 or taking the form of control server 802, may associate the article information with the assigned destination container. Accordingly, after the article information on the oversized article has been obtained by the central controller, the centralized controller assigns a computer-controlled vehicle 12 to transport the scanned oversized article to the assigned destination container and deposit the oversized article at an assigned destination container.

The article information may accordingly be associated with the computer-controlled vehicle. In one embodiment, an identifying tag on the article carries the article information that is read by an imager or scanner, for example, at the induction location. In one embodiment, after the article is inducted onto a computer-controlled vehicle, the centralized controller determines which receiving location (e.g., a destination container) the oversized article will be sent to; the centralized controller then directs the computer-controlled vehicle to the selected receiving location (e.g., a selected destination container). Once the computer-controlled vehicle arrives and transfers the oversized article into the destination container, the computer-controlled vehicle will return to its normal operating behavior.

In various embodiments, each induction location may include an information acquisition device such as, for e.g., an information scanner, for scanning an article information available on the article. The information scanner may be configured to send the article information, determined from scanning the article's label, for example, with the information scanner, to the centralized controller or control server. The centralized controller then determines, based on the received article information, that the article 14 constitutes an oversized article, or the article includes a maximum article dimension; the centralized controller then actuates specific turning maneuver procedures for the computer-controlled vehicle that carries the oversized article to the destination container. The centralized controller directs a computer-controlled vehicle 12 to transport the oversized article. In various embodiments, a grid as mentioned herein is one or more grid cells 18 that make up a rectangular area on the grid. Grid areas are created when grid cells 18 are placed using line-based placement or when defining areas using named grid areas.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various embodiments, control server 802 and/or host management server 804 can be or can otherwise include a server as the term "server" is understood in its broadest sense. The term "server" as used herein includes any computer that provides data to other computers. It may serve data to systems on a local area network (LAN) or a wide area network (WAN) over the Internet. In various embodiments, one or more of control server 802 and host management server 804 can be or can include a cloud server. The term "cloud server" as used herein includes any pooled, centralized server resource that is hosted and delivered over a network-typically the Internet- and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components shown in FIGS. 1-9 may be in communication with one or more other components through a wired and/or a wireless network. For example, the cloud, the control server 802, and/or the host management server 804 may further communicate with article information database 808, routing engine 812, wireless access point 814, and computer-controlled vehicles 12 over a network.

In one embodiment, control server 802 includes a controller. In at least on embodiment, control server 802 is configured to determine a identify an article information of an article 14 placed on a first computer-controlled vehicle 12. Control server 802 is further configured to direct the first computer-controlled vehicle 12 to transport the article 14 that may be an oversized article to an appropriate location such as a destination container. In at least one embodiment, control server 802 includes a processor that is configured for directing one of a plurality of computer-controlled vehicles such as computer-controlled vehicles 12 to transport the article 14 in the form of an oversized article from an induction location to a destination container. The processor of control server 802 is further configured for associating the article 14 received at the induction location with the computer-controlled vehicle that received the article 14. The processor of control server 802 is further configured for directing the computer-controlled vehicle that received the article 14 to a selected one of a plurality of destination containers for discharging or depositing the oversized article 14.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A method comprising:

assigning, by a routing engine, travel routes about a grid comprising grid cells for a first computer-controlled vehicle such that during a period when the first computer-controlled vehicle is undertaking a turning maneuver in a first grid cell, either a second computer-controlled vehicle does not undertake a turning maneuver in a second grid cell that is adjacent to the first grid cell, or the second computer-controlled vehicle is not present in the second grid cell that is adjacent to the first grid cell; and transporting, by the first computer-controlled vehicle, of a first article.

2. The method of claim 1, further comprising: transporting of a second article on the second computer-controlled vehicle.

3. The method of claim 2, further comprising: receiving, at a control server, article information corresponding to the first article and the second article.

4. The method of claim 2, further comprising: controlling, by the routing engine, the turning maneuver of the first computer-controlled vehicle in the first grid cell such that there is no contact between the first article carried on the first computer-controlled vehicle with the second article carried on a second computer-controlled vehicle present in a second grid cell that is adjacent to the first grid cell when the first computer-controlled vehicle is undertaking the turning maneuver.

5. The method of claim 2, wherein the first article and a second article each have a first article dimension, wherein the first article dimension exceeds a predetermined range such that a turn radius of the first article carried on the first computer-controlled vehicle overlaps the turn radius of the second article carried on the second computer-controlled vehicle during simultaneous turning maneuvers of the first and second computer-controlled vehicles in the first and second grid cells respectively.

6. The method of claim 5, wherein the first article dimension comprises a first length L and a first width W, wherein C is a required clearance distance between the first and second articles when both the first and second computer-controlled vehicles are undertaking the turning maneuvers simultaneously, wherein a length G of each grid cell is calculated such that $G \geq V\sqrt{(W^2+L^2)}/2+L/2+C$.

7. The method of claim 6, wherein the turning maneuver by the first computer-controlled vehicle comprises a turn diameter that equals a length of a diagonal D formed by the first length L and the first width W.

8. The method of claim 2, further comprising: assigning, by the routing engine, a value of C, wherein C is a required clearance distance between the first and second articles when both the first and second computer-controlled vehicles are undertaking the turning maneuvers simultaneously, such that $C \geq 1$ mm.

9. The method of claim 5, further comprising: calculating, by the routing engine, an area for each of the grid cells that the grid is comprised of based on the first article dimension.

10. The method of claim 5, further comprising: providing, to the routing engine, an area for each of the grid cells that the grid is comprised of based on the first article dimension.

11. The method of claim 5, wherein the first article dimension comprises at least one of a: first length, first width, first area, and first volume.

12. The method of claim 2, further comprising: calculating a minimum area of each of the grid cells that the grid is comprised of such that there is no contact between the first article and the second article when the first computer-controlled vehicle is undertaking the turning maneuver.

13. The method of claim 1, further comprising: directing, by the routing engine, a plurality of computer-controlled vehicles to transport a plurality of articles to a plurality of destination containers.

14. The method of claim 1, further comprising: controlling, by the routing engine, a travel path of the first computer-controlled vehicle such that the first computer-controlled vehicle does not deviate more than 10 mm of an intended travel path.

15. The method of claim 1, wherein the grid cell comprises a polygon shape.

16. The method of claim 1, wherein the grid cell comprises a square shape.

17. The method of claim 1, wherein the grid cell comprises a rectangle shape.

18. The method of claim 1, wherein the turning maneuver by the first computer-controlled vehicle comprises a turn of at least 90-degrees.

19. The method of claim 1, wherein the turning maneuver by the first computer-controlled vehicle comprises a turn of at least 180-degrees.

20. A system comprising a server, the server comprising a memory, a processor, and a routing engine, the system configured to:

assign, by the routing engine, travel routes about a grid comprising grid cells for a first computer-controlled vehicle such that during a period when the first computer-controlled vehicle is undertaking a turning maneuver in a first grid cell, either a second computer-controlled vehicle does not undertake a turning maneuver in a second grid cell that is adjacent to the first grid cell, or the second computer-controlled vehicle is not present in the second grid cell that is adjacent to the first grid cell; and transport, by the first computer-controlled vehicle, of an article.

* * * * *